United States Patent
Sun et al.

(10) Patent No.: US 9,788,004 B2
(45) Date of Patent: Oct. 10, 2017

(54) METHOD OF COLOR INDEX CODING WITH PALETTE STUFFING

(71) Applicant: HFI Innovation Inc., Zhubei, Hsinchu County (TW)

(72) Inventors: Yu-Chen Sun, Keelung (TW); Tzu-Der Chuang, Zhubei (TW); Yi-Wen Chen, Taichung (TW); Yu-Wen Huang, Taipei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

(21) Appl. No.: 15/123,847

(22) PCT Filed: Mar. 12, 2015

(86) PCT No.: PCT/CN2015/074088
§ 371 (c)(1),
(2) Date: Sep. 6, 2016

(87) PCT Pub. No.: WO2015/135484
PCT Pub. Date: Sep. 17, 2015

(65) Prior Publication Data
US 2017/0019677 A1    Jan. 19, 2017

Related U.S. Application Data

(60) Provisional application No. 61/952,917, filed on Mar. 14, 2014, provisional application No. 61/972,584, filed on Mar. 31, 2014.

(51) Int. Cl.
*H04N 19/50* (2014.01)
*H04N 19/593* (2014.01)
(Continued)

(52) U.S. Cl.
CPC .......... *H04N 19/50* (2014.11); *H04N 19/105* (2014.11); *H04N 19/13* (2014.11); *H04N 19/46* (2014.11);
(Continued)

(58) Field of Classification Search
CPC ....................................................... H04N 19/50
See application file for complete search history.

(56) References Cited

U.S. PATENT DOCUMENTS

| 2003/0169932 A1 | 9/2003 | Li et al. |
| 2004/0156543 A1* | 8/2004 | Gardella ............... G06T 9/005 |
| | | 382/166 |

(Continued)

FOREIGN PATENT DOCUMENTS

| CN | 1925612 | 3/2007 |
| CN | 101141637 | 3/2008 |

(Continued)

OTHER PUBLICATIONS

International Search Report dated Jun. 17, 2015, issued in application No. PCT/CN2015/074088.

(Continued)

*Primary Examiner* — James Pontius
(74) *Attorney, Agent, or Firm* — McClure, Qualey & Rodack, LLP

(57) ABSTRACT

A method of coding a block of video data using palette coding is disclosed. According to the present invention, when a previous block is available, the system receives first information related to a previous palette set corresponding to previous palettes/triplet palette, and second information related to a previous palette predictor set corresponding to previous palette predictors/triplet-palette predictors associated with the previous block. The system then derives a current palette predictor set corresponding to current palette predictors/triplet-palette predictor associated with the current block based on the previous palette set and the previous palette predictor set by including at least one unused color or triplet of the previous palette predictor set in the current palette predictor set. A current palette set corresponding to current palettes/triplet-palette associated with the current (Continued)

| Predictor | |
|---|---|
| Last Palette Size | 10 |
| Major Color Index | Major Color Value |
| 0 | Value$_0$ |
| 1 | Value$_1$ |
| 2 | Value$_2$ |
| ... | |
| N$_{max}$ | Value$_N$ |

Derive Palette

| Palette for Current CU | |
|---|---|
| Palette Size | 10 |
| Major Color Index | Major Color Value |
| 0 | Value$_0$ |
| 1 | Value$_1$ |
| ... | |
| 9 | Value$_9$ | block is derived from the current palette predictor set for palette encoding or decoding.

20 Claims, 5 Drawing Sheets

(51) Int. Cl.
    *H04N 19/463*     (2014.01)
    *H04N 19/105*     (2014.01)
    *H04N 19/13*     (2014.01)
    *H04N 19/46*     (2014.01)
    *H04N 19/176*     (2014.01)
    *H04N 19/182*     (2014.01)
    *H04N 19/186*     (2014.01)

(52) U.S. Cl.
    CPC ......... *H04N 19/463* (2014.11); *H04N 19/593* (2014.11); *H04N 19/176* (2014.11); *H04N 19/182* (2014.11); *H04N 19/186* (2014.11)

(56) References Cited

U.S. PATENT DOCUMENTS

| | | | |
|---|---|---|---|
| 2011/0110416 A1 | 5/2011 | Lawrence | |
| 2015/0016501 A1* | 1/2015 | Guo | G06T 9/00 375/240.02 |
| 2016/0316199 A1* | 10/2016 | Chuang | H04N 19/176 |

FOREIGN PATENT DOCUMENTS

| | | |
|---|---|---|
| EP | 3080990 | 10/2016 |
| WO | 2015086718 A2 | 6/2015 |
| WO | 2015086718 A3 | 6/2015 |

OTHER PUBLICATIONS

Sun, Y.C., et al.; "SCCE3 Test A.2: Palette coding and palette predictor updates;" Joint Collaborative Team on Video Coding (JCT-VC) of ITU-T SG 16 WP 3 and ISO/IEC JTC 1/SC 29/WG 11; Jul. 2014; pp. 1-11.

Laroche, et al.: "Non-RCE4: Palette Prediction for Palette mode"; Joint Collaborative Team on Video Coding (JCT-VC) of ITU-T SG 16 WP 3 and ISO/IEC JTC 1/SC 29/WG 11 16th Meeting: San Jose, US, Jan. 9-17, 2014; pp. 1-6.

Chuang, et al.: "Non-RCE4: Major color table propagation through non-palette CUs"; Joint Collaborative Team on Video Coding (JCT-VC) of ITU-T SG 16 WP 3 and ISO/IEC JTC 1/SC 29/WG 11 16th Meeting: San Jose, US, Jan. 9-17, 2014; pp. 1-6.

Zhu, et al.: "Template-based palette prediction"; Joint Collaborative Team on Video Coding (JCT-VC) of ITU-T SG 16 WP 3 and ISO/IEC JTC 1/SC 29/WG 11 13th Meeting: Incheon, KR, Apr. 18-26, 2013; pp. 1-17.

* cited by examiner

| 1st Component's Major Color Index | 1st Component's Major Color Value |
|---|---|
| 0 | |
| ... | |
| $N_1$ | |

| 2ed Component's Major Color Index | 2ed Component's Major Color Value |
|---|---|
| 0 | |
| ... | |
| $N_2$ | |

| 3rd Component's Major Color Index | 3rd Component's Major Color Value |
|---|---|
| 0 | |
| ... | |
| $N_3$ | |

Fig. 1A

| Triplet Index | 1st Component's Major Color Index | 2ed Component's Major Color Index | 3rd Component's Major Color Value |
|---|---|---|---|
| 0 | | | |
| ... | | | |
| $N_4$ | | | |

Fig. 1B

| Predictor | | Current Palette | |
|---|---|---|---|
| 0 | Value$_0$ | 0 | Value$_0$ |
| 1 | Value$_1$ | 1 | Value$_3$ |
| 2 | Value$_2$ | 2 | Value$_2$ |
| 3 | Value$_3$ | 3 | Value$_3$ |
| 4 | Value$_4$ | | |
| ... | ... | | |
| 63 | Value$_{63}$ | | |

| Next Predictor | | Next Palette | |
|---|---|---|---|
| 0 | Value$_0$ | 0 | Value$_0$ |
| 1 | Value$_3$ | 1 | Value$_1$ |
| 2 | Value$_2$ | 2 | Value$_2$ |
| 3 | Value$_3$ | 3 | Value$_3$ |
| 4 | Value$_4$ | 4 | Value$_4$ |
| ... | ... | ... | ... |
| 63 | Value$_{63}$ | 63 | Value$_{63}$ |

Fig. 5B

| Predictor | | Current Palette | |
|---|---|---|---|
| 0 | Value$_0$ | 0 | Value$_0$ |
| 1 | Value$_1$ | 1 | Value$_3$ |
| 2 | Value$_2$ | 2 | Value$_2$ |
| 3 | Value$_3$ | | |
| ... | ... | | |
| 63 | Value$_{63}$ | | |

| Next Predictor | | Next Palette | |
|---|---|---|---|
| 0 | Value$_0$ | 0 | Value$_0$ |
| 1 | Value$_3$ | 1 | Value$_3$ |
| 2 | Value$_2$ | 2 | Value$_2$ |
| 3 | Value$_3$ | 3 | Value$_1$ |
| ... | ... | ... | ... |
| 63 | Value$_{63}$ | 63 | Value$_{63}$ |

Fig. 5C

METHOD OF COLOR INDEX CODING WITH PALETTE STUFFING

CROSS REFERENCE TO RELATED APPLICATIONS

The present invention claims priority to U.S. Provisional Patent Application, Ser. No. 61/952,917, filed on Mar. 14, 2014 and U.S. Provisional Patent Application, Ser. No. 61/972,584, filed on Mar. 31, 2014. The U.S. Provisional Patent Applications are hereby incorporated by reference in their entireties.

FIELD OF THE INVENTION

The present invention relates to color index coding for video data. In particular, the present invention relates to techniques to improve the performance of color index coding by using palette generated with palette stuffing.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 color formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency. Among them, the color index coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the color index coding becomes very effective for screen content materials.

During the early development of HEVC range extensions (RExt), several proposals have been disclosed to address palette-based coding. For example, a palette prediction and sharing technique is disclosed in JCTVC-N0247 (Guo et al., "*RCE3: Results of Test 3.1 on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, A T, 25 Jul.-2 Aug. 2013 Document: JCTVC-N0247) and JCTVC-O0218 (Guo et al., "*Evaluation of Palette Mode Coding on HM*-12.0+*RExt*-4.1", Joint Collaborative Team on Video Coding (JCT-VC) of ITU-T SG 16 WP 3 and ISO/IEC JTC 1/SC 29/WG 11, 15th Meeting: Geneva, C H, 23 Oct.-1 Nov. 2013, Document: JCTVC-O0218). In JCTVC-N0247 and JCTVC-O0218, the palette of each color component is constructed and transmitted. The palette can be predicted (or shared) from its left neighboring CU to reduce the bitrate. All pixels within the given block are then coded using their palette indices. An example of encoding process according to JCTVC-N0247 is shown as follows.

1. Transmission of the palette: the color index table size is first transmitted followed by the palette elements.
2. Transmission of pixel values: the pixels in the CU are encoded in a raster scan order. For each group of one or more pixels, a flag for a run-based mode is first transmitted to indicate whether the "run" mode or "copy-above" mode is being used.
   2.1 "run" mode: In the "run" mode, a palette index is first signaled followed by "palette_run" (e.g., M) representing the run value. The run value indicates that a total of M samples are all coded using "run" mode. No further information needs to be transmitted for the current position and the following M positions since they have the same palette index as that signaled in the bitstream. The palette index (e.g., i) may also be shared by all three color components, which means that the reconstructed pixel values are $(Y, U, V)$=$(palette_Y[i], palette_U[i], palette_V[i])$ for the case of YUV color space.
   2.2 "copy-above" mode: In the "copy-above" mode, a value "copy_run" (e.g., N) is transmitted to indicate that for the following N positions (including the current one), the palette index is the same as the corresponding palette index in the row above.
3. Transmission of residue: the palette indices transmitted in Stage 2 are converted back to pixel values and used as the prediction. Residue information is transmitted using HEVC residual coding and is added to the prediction for the reconstruction.

In JCTVC-N0247, the palette of each component are constructed and transmitted. The palette can be predicted (shared) from its left neighboring CU to reduce the bitrate. In JCTVC-O0218, each element in the palette is a triplet, representing a specific combination of the three color components. The predictive coding of palette across CU is removed.

Yet another major color-base coding (color index coding) method is disclosed by Guo et al. in JCTVC-O0182 (Guo et al., "*AHG*8: *Major-color-based screen content coding*", Joint Collaborative Team on Video Coding (JCT-VC) of ITU-T SG 16 WP 3 and ISO/IEC JTC 1/SC 29/WG 11, 15th Meeting: Geneva, C H, 23 Oct.-1 Nov. 2013, Document: JCTVC-O0182). According to JCTVC-O0182, the palette of each component are constructed and transmitted. However, instead of predicting the entire palette from the left CU, individual entry in a palette can be predicted from the exact corresponding palette entry in the above CU or left CU.

According to JCTVC-O0182, a predictive coding method is applied on the indices for transmission of pixel values, where a pixel line can be predicted by different modes. In specific, three kinds of line modes are used for a pixel line, i.e. horizontal mode, vertical mode and normal mode. In horizontal mode, all the pixels in the same line have the same value. If the value is the same as the first pixel of the above pixel line, only line mode signaling bits are transmitted. Otherwise, the index value is also transmitted. In vertical mode, the current pixel line is the same with the above pixel line. Therefore, only line mode signaling bits are transmitted. In normal mode, pixels in a line are predicted individually. For each pixel, the left or above neighboring pixel is used as predictor, and the prediction symbol is transmitted to the decoder. Furthermore, pixels are classified into major color pixels and escape pixels. For major color pixels, the decoder reconstructs the pixel values using the major color indices and palette. For escape pixels, the encoder will further send the pixel values.

It is desirable to develop methods for further improving the coding efficiency associated with the color index coding.

BRIEF SUMMARY OF THE INVENTION

A method of coding a block of video data using palette coding for a video coding system is disclosed. According to the present invention, when a previous block is available, the system receives first information related to a previous palette set corresponding to previous palettes/triplet palette, and second information related to a previous palette predictor set corresponding to previous palette predictors/triplet-palette predictors associated with the previous block. The system then derives a current palette predictor set corresponding to current palette predictors/triplet-palette predictor associated with the current block based on the previous palette set and the previous palette predictor set by including at least one unused color or triplet of the previous palette predictor set in the current palette predictor set when at least one unused color or triplet of the previous palette predictor set in the current palette predictor set exists. A current palette set corresponding to current palettes/triplet-palette associated with the current block is derived from the current palette predictor set. After the current palette set is derived, palette encoding or decoding is applied to the current block according to the current palette set.

One or more next updating signals can be signaled for deriving a next palette predictor set based on the current palette set and the current palette predictor set. A number of previous palette predictors/triplet-palette predictor in the previous palette set corresponds to M, and M sets of previous palette predictors/triplet-palette predictor in the previous palette set can be maintained at an encoder side or a decoder side, and M is an integer greater than zero. The previous block and the current block may correspond to coding units or prediction units. The current palette predictor set may be derived depending on the coding-unit size if the previous block and the current block correspond to the coding units, or depending on the prediction-unit size if the previous block and the current block correspond to the prediction units.

The derivation process for the current palette predictor set may comprise updating the previous palette predictor set according to one or more updating signals. The updating signals may include a last palette-size or a new palette-size, and the current palette set is derived from the current palette predictor set by copying a number of beginning entries of the current palette predictor set, and the number corresponds to the last palette-size or the new palette-size. In another example, the updating signals may include new palette-size for each of current palettes/triplet-palette associated with the current block, a number of modification flags corresponding to new palette-size to identify whether the corresponding entries of current palettes/triplet-palette associated with the current block are updated, and a new value for each to-be-modified entry as indicated by the corresponding modification flag. One or more modification flags can be context adaptive coded using context-adaptive binary arithmetic coding (CABAC). Also, one or more modification flags can be context adaptive coded using a bypass mode of CABAC. Modification flags can be limited to the beginning NP entries of current palettes/triplet-palette associated with the current block, and remaining entries are forced to be modified, where NP is a positive integer.

If the palette size of previous palettes/triplet-palette is smaller than a maximum palette size, then non-reused entries of previous palette predictors/triplet-palette predictor can be copied to current entries of current palette predictors/triplet-palette predictor after the current block is encoded or decoded by the palette coding. If the palette size of previous palettes/triplet-palette is larger than a maximum palette predictor size, then one or more updating values associated with the previous palette predictor set are not used by the previous palette set, and the updating values can be derived or transmitted. The derivation process of the current palette predictor set may include checking and removing redundancy in the current palette predictor set. The process of checking and removing redundancy can be performed before, during or after one or more new entries are placed into the current palette predictor set.

If the current block is at a first block in a slice, tile, largest coding unit row, or largest coding unit, then the previous block is invalid. In this case, the current palette set is derived by an encoder without the previous palette set nor the previous palette predictor set.

BRIEF DESCRIPTION OF THE DRAWINGS

FIG. 1A illustrates an example of mapping color values to color indices on a component-wise basis, where each color component uses its own palette.

FIG. 1B illustrates an example of mapping color values to triplets based on color combinations, where each color components use a triplet palette.

FIG. 5B illustrates an example of current palette predictor derived from a last coded palette and the previous palette predictor according an embodiment of the present invention.

FIG. 5C illustrates an example of current palette predictor derived from a last coded palette and the previous palette predictor with redundancy checking according an embodiment of the present invention.

DETAILED DESCRIPTION OF THE INVENTION

Figure 2:
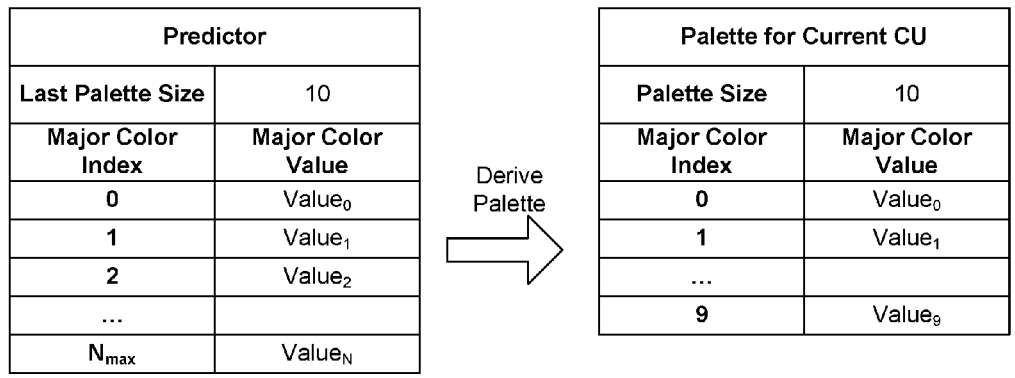
FIG. 2 illustrates an example of palette derivation from palette predictor using a palette sharing mode.

In the present invention, various techniques to improve the performance of color index coding are disclosed. In particular, a new copy run mode that uses one or more previous decoded indices to identify index prediction candidates for a current index. In one embodiment of the present invention, a layered color representation is disclosed as follows.

Layered Color Representation

In the palette coding mode, pixels in each CU are classified into major colors and escape pixels. Major colors are the most representative pixel values in a CU like a palette, which cover the majority pixels of the CU. Escape pixels are the pixels that do not belong to the major colors.

Layered color representation (LC) method is disclosed herein for major color representation. Based on the LC representation, each pixel is represented by a triplet color index. And the triplet color index (also named triplet index) is predictively coded and transmitted to indicate whether the pixel is a major-color pixel or not. If the pixel is a major-color pixel, further information is transmitted to indicate the major color it belongs to.

As an example of layered major colors for the CU, a two layers representation is used. The first layer is to describe the most representative color values in each component, called major colors. Based on major colors, the second layer is to identify the most representative combination, called major (color) combination.

A. Examples of Layered Color Representation

For each CU, an encoder first calculates the histogram of color values on a component-wise basis and chooses a set of representative major color values. These major colors are stored as component-wise palettes. The encoder further chooses a set of representative color combinations of the major color values based on component-wise palettes. The combinations are recorded in a triplet palette format.

The layered color representation can be applied to color pixels in any color format (e.g., YUV444, YUV420, YUV422, YUV400 or RGB444). The color combination of the second layer can be applied on subset of components. For example, the color combination may correspond to UV only in the YUV420 format.

For YUV444 and RGB444, the combination of second layer can be applied to all components as FIG. 1A and FIG. 1B. As shown in FIG. 1A, each of the three color components has its own color palette. The color indices for the three color components are from 0 to $N_i$, where i=1, 2 or 3. FIG. 1B illustrates the three color components jointly use triplet index, $N_4$.

With palettes and a triplet palette, a pixel can be represented by a triplet index. A decoder first use the triplet index to find out three major color indexes for the three color components from the triplet palette. The major color indexes are used to identify color values from the palettes and to reconstruct the pixels.

For YUV420 and YUV422, the combination of second layer can be applied to the UV components. Therefore, one palette index is used for Y component and one triplet index for the UV components to represent a color pixel. While there are only two color components (i.e., U and V) in this case, the term "triplet index" is also used to refer to two-color index.

B. Palette and Triplet Palette Coding

During decoding, a decoder maintains M sets of palette predictors and triplet palette predictors. M can be transmitted or derived. M can be as small as one. If M is larger than one, the encoder may further signal which predictor is used or the decoder can derive it.

At the decoder side, a decoder can derive which predictor is used according to the CU size. In other words, CUs with different sizes will use different predictors. Similarly, a decoder can derive which predictor is used according to the PU size or other related unit size.

A predictor may contain the last palette size and a palette with NMax entries, where NMax can be equal to the size of palette and triplet palette.

For a palette coded (i.e., color index coded) CU, its palettes or triplet palette to be used can be derived from the predictor.

C. Palette and Triplet Palette Sharing Mode

Palette sharing mode can use palette predictors directly without modification. The palette to be used in the current CU is derived according to recorded last palette size. An example of palette and triplet palette sharing is shown in FIG. 2, where the last recorded palette size is 10. Accordingly, the first 10 entries in the palette predictor will be extracted directly to form a palette for the current CU.

Palette sharing mode can also signal a new size value. The palette is then derived from the palette predictor directly only with size modification.

D. Palette and Triplet Palette Normal Mode

Figure 3:
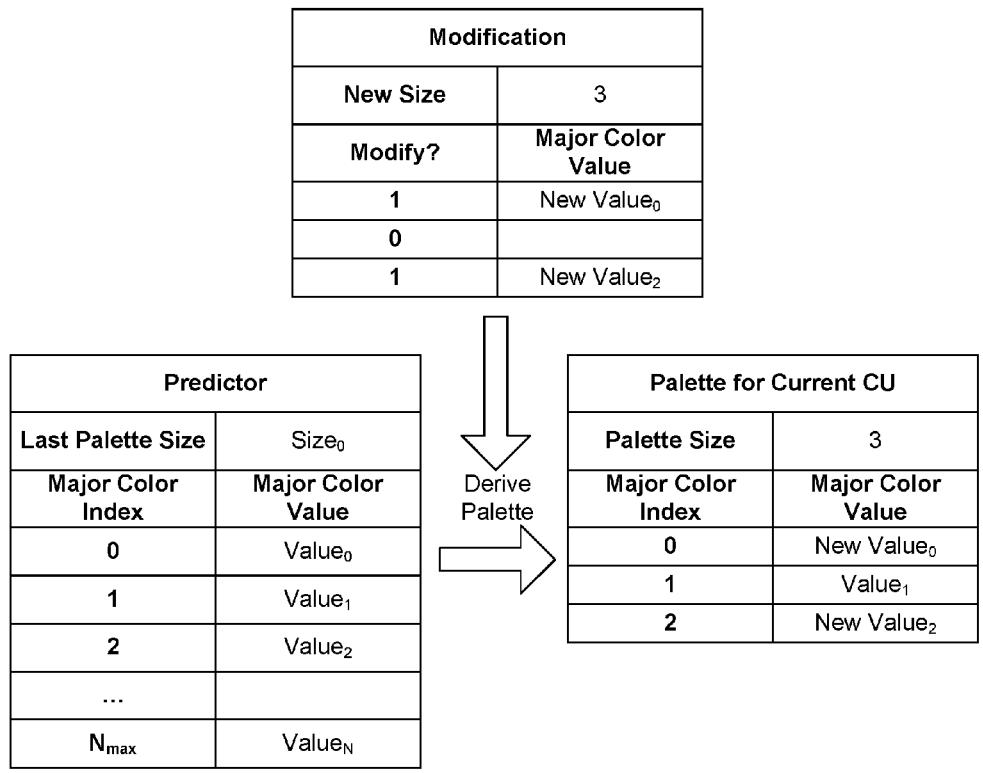
FIG. 3 illustrates an example of palette derivation from palette predictor using a normal mode based on palette updating signals.

In normal mode, information of palette modification will be signaled to indicate how to derive a palette from the palette predictor. FIG. 3 illustrates an example of palette predictor derivation. First, the new size is signaled to indicate the new palette size (e.g., 3) as shown in the "modification" table of FIG. 3. A bit to indicate will be signaled for each entry of the palette to indicate whether the value needs to be modified. If it needs to be modified, a new value will be further signaled. For example, New Value$_0$ and New Value$_2$ in FIG. 3 are used to modify major color indexes 0 and 2.

A prediction flag for each palette entry and each triplet palette entry can be signaled to indicate if the palette or triplet palette can reuse the previous coded palette or triplet palette for the corresponding entry, or the palette or triplet palette needs to be modified or transmitted. The prediction flag can be coded using context model based on context-adaptive binary arithmetic coding (CABAC) for the bin of the prediction flag.

The prediction flag can be limited to the first $N_P$ entries. In other words, for each entry smaller than $N_P$, a prediction flag will be signaled. Otherwise, the entry will be forced to be modified. $N_P$ can be derived or transmitted.

To improve bitstream parsing throughout, all of the prediction flags or part of the prediction flags can be coded in the bypass mode. For example, the first N prediction flags are coded in the context coded mode and the rest prediction flags are coded in the bypass mode. N can be transmitted or derived.

Various examples of N for the first N palette entries are shown as follows for a system with the total number of entries in each color palette being 16 and the total number of entries for the triplet palette being 64:

- N is 16 for the palette predictors and 64 for the triplet palette predictor, i.e. all flags are coded in the CABAC mode.
- N is 0 for the palette predictors and triplet palette predictor, i.e. all flags are coded in the bypass mode.
- N is 8 or 16 for the palette predictors.
- N is 8, 16, 32, 48, or 64 for the triplet palette predictor.
- N is derived based on the CU size.
- N is derived based on the CU size. For example, when CU size is smaller than $S_{bypass}$, N is equal to $N_1$. Otherwise, N is equal to $N_2$.
  a. $N_2$ is 16 for the palette predictors and 64 for the triplet palette predictor, i.e. all flags are coded in the CABAC mode. $N_1$ is 0, 8, 16, 32, 48, or 64 for the palette predictors or the triplet palette predictor.
  b. $S_{bypass}$ can be 8×8, 16×16, 32×32, or 64×64 CU.

Palette and Triplet Palette Predictors Updating

During decoding, the decoder maintains M sets of palettes predictors and triplet palette predictor. At the beginning of decoding each slice, the decoder can initialize predictors with transmitted or derived values.

After a palette coded CU is decoded, the predictors will be updated if the modification is signaled. If the palette size is not equal to the maximum size, the non-reused palette can be preserved in the table as palette predictors.

Before, during or after updating the palette predictor, the decoder can check for redundant index values in the predictor and the updated information. The decoder can remove redundant values if any redundant value is found. For example, after updating, the decoder can remove redundant values in the palette predictor. In another example, after updating and preserving the non-reused palette, the decoder can remove redundant values in the palette predictor. If the palette predictor size is larger than the maximum palette predictor size, the values not belonging to the maximum size of entries of the palette predictor can be dropped. The maximum size can be derived or transmitted. The derived position to be dropped can be the largest position.

Figure 4:
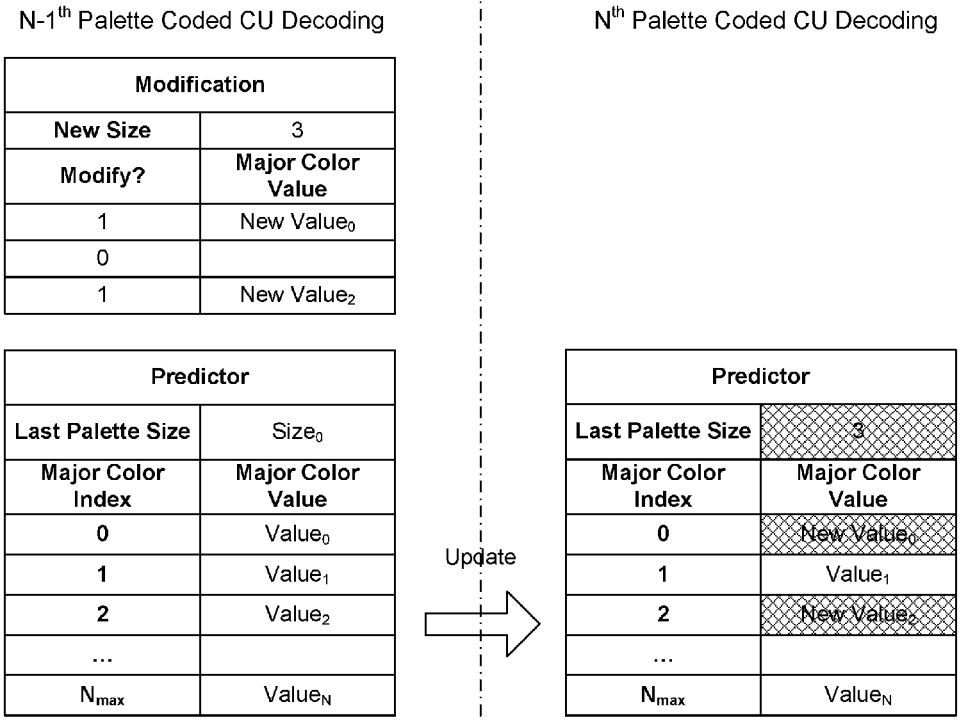
FIG. 4 illustrates an example of palette derivation from palette predictor using a normal mode based on palette updating signals, where the un-reused entries in the previous palette predictor are propagated into the current predictor.

FIG. 4 shows an example of predictor updating. During decoding the (N−1)th palette coded CU, a modification is signaled including New Size=3, modification flags and the new values of first and third entry. After decoding the (N−1)th palette coded CU, the predictor will be updated accordingly. The updated fields are indicated by patterned background in FIG. 4.

After a palette coded CU is decoded, the predictors can be updated if the modification is signaled.

The palette and/or triplet palette predictors can be reset at a slice-level, tile-level, LCU-row-level, or LCU-level. The reset can be turned on when Wavefront Parallel Processing (WPP) is applied. For the reset process, the palette and triplet palette predictors can be set to a predefined or derived value (e.g., 0) or can inherit the palette and triplet palette of an upper-right block of the current CU or PU.

An encoder can choose a triplet color to represent a pixel. The encoder first quantizes color values to color indexes on a component wise basis. The encoder can use color indexes (two or three) to find a match or similar color combination. The "match" color combination may correspond to all color indexes that are the same. The "match" color combination may also correspond to a color combination that some color indexes are the same and the different color indexes correspond to escape color indexes. In other word, the encoder can use an escape color to represent a major color. The "match" color combination may also correspond to the color indexes that are within the same quantization zone.

To calculate palettes and triplet palette, an encoder calculates the histogram of color values and chooses a set of representative major color values. These major colors are stored as component-wise palettes. Based on the major color values of the component-wise palettes, the encoder may further calculate the histogram of triplet colors and choose a set of representative color combinations (triplet colors). The combinations are recorded in a triplet (palette). If there are multiple matches or similar triplet colors, the encoder can choose a triplet color with most same major indexes.

To choose representative major colors or triplet colors, the encoder can sequentially choose the values with highest frequencies in the histogram within a quantization zone. When the histogram is reset, the histogram values within a quantization zone are reset to zeros, where "within a quantization zone" refers to the case that some color indexes are the same and those different color indexes in palette color correspond to escape color indexes. In other words, the encoder may use an escape color to represent a major color.

To choose representative major colors or triplet colors, the encoder can sequentially choose the major colors or triplet color having peak frequency in the histogram and reset the histogram values within the quantization zone to zero.

After the encoder decides major colors in the palette, the encoder can order colors in the palette according to the colors in the predictor. For example, color ordering for the palette can be similar to the color ordering for the predictor, and colors are placed in the same entry for both the palette and the predictor. This can minimize the modification required for palette predictor updating. The "similar" color refers to the same color or a color within a predefined or derived quantization step of the same color. If a color is "similar" to multiple colors in the palette predictor, the encoder can place the color at an entry with smallest index. Alternatively, the encoder can place the color at the entry with largest index.

In the case that a triplet color is used, after the encoder decides triplet colors in the triplet palette, the encoder can order the colors in the triplet palette according to the colors in the predictor. For example, color ordering for the triplet palette can be similar to the color ordering of the predictor, and a triplet is placed in the same entry for both the triplet palette and the predictor. The "similar" color refers to the case that some color indexes are the same and these colors with different color indexes in palette color correspond to escape color indexes. In other word, an encoder can use an escape color to represent a major color. The definition of "similar" can be that the color indexes are within the same quantization zone. If a color is similar to multiple colors in the predictor, the encoder can place the color at the entry with the smallest index. Alternatively, the encoder can order the color at the entry with the largest index.

The palette prediction and/or coding methods disclosed above can also be applied to other palette methods, such as these methods described in JCTVC-O0218, JCTVC-N0247 and JCTVC-O0182. A decoder can maintain palette predictors according to different palette structures.

For example, a decoder can maintain the palette predictors. Each entry of the predictor contains the color values of multiple color components. For example, the present invention can be applied to the method as disclosed in JCTVC-O0182. Accordingly, each entry contains 3 values for the RGB and YUV444 formats, and 2 values for UV in YUV422 and YUV420 formats, and 1 value for Y in YUV400, YUV422, and YUV420 formats.

Figure 5A:
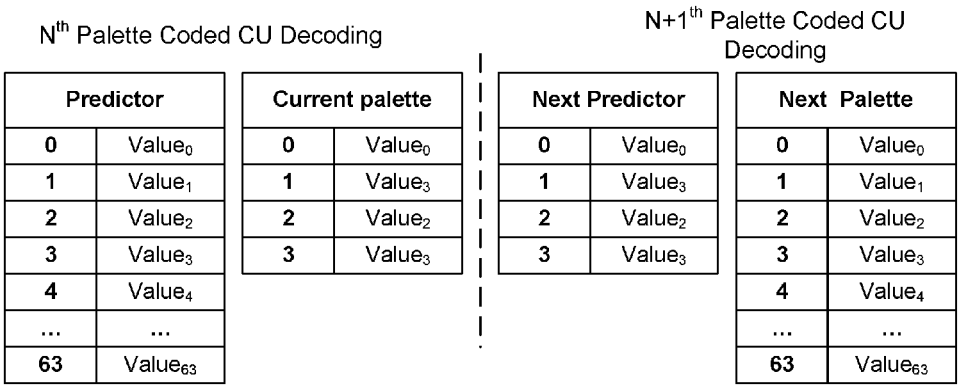
FIG. 5A illustrates an example of current palette predictor derived from a last coded palette according an existing color index coding.

FIG. 5A illustrates an example of current palette predictor derived from a last coded palette according an existing color index coding. The current palette contains four entries corresponding to $Value_0$, $Value_3$, $Value_2$ and $Value_3$ respectively. The current palette then becomes the next palette prediction according to the existing method. If the next palette contains 64 entries with indexes from 0 to 63, the next palette predictor is not very efficient due to the small palette predictor size.

FIG. 5B illustrates an example of current palette predictor derived from a last coded palette and the previous palette predictor according an embodiment of the present invention. In this example, entries of the current palette predictor with indexes 4 through 63 are not reused. According to one embodiment, entries of the current palette predictor with indexes 4 through 63 are added to the next palette predictor to fill up all entries. Therefore, the palette predictor is expected to provide better prediction for the next palette.

FIG. 5C illustrates an example of current palette predictor derived from a last coded palette and the previous palette predictor with redundancy checking according an embodiment of the present invention. In this example, the current palette contains three entries corresponding to $Value_0$, $Value_3$ and $Value_2$ respectively. Entries of the current palette predictor with indexes 3 through 63 are not reused and are copied to entries 3 through 63 of the next predictor. A redundancy checking is performed and a redundant entry $Value_3$ is identified as highlighted by patterned background. Accordingly, an un-reused value $Value_1$ with index 1 is used to replace the redundant entry in the next palette.

The performance of a coding system incorporating an embodiment of the present invention is compared to that of an anchor system corresponding to a system without palette predictor across CU and without redundancy checking. The comparisons are performed under All Intra (AI) coding configuration. The performance is as much as 7% in terms of BD-rate, which is a performance measurement commonly used for video coding.

Figure 6:
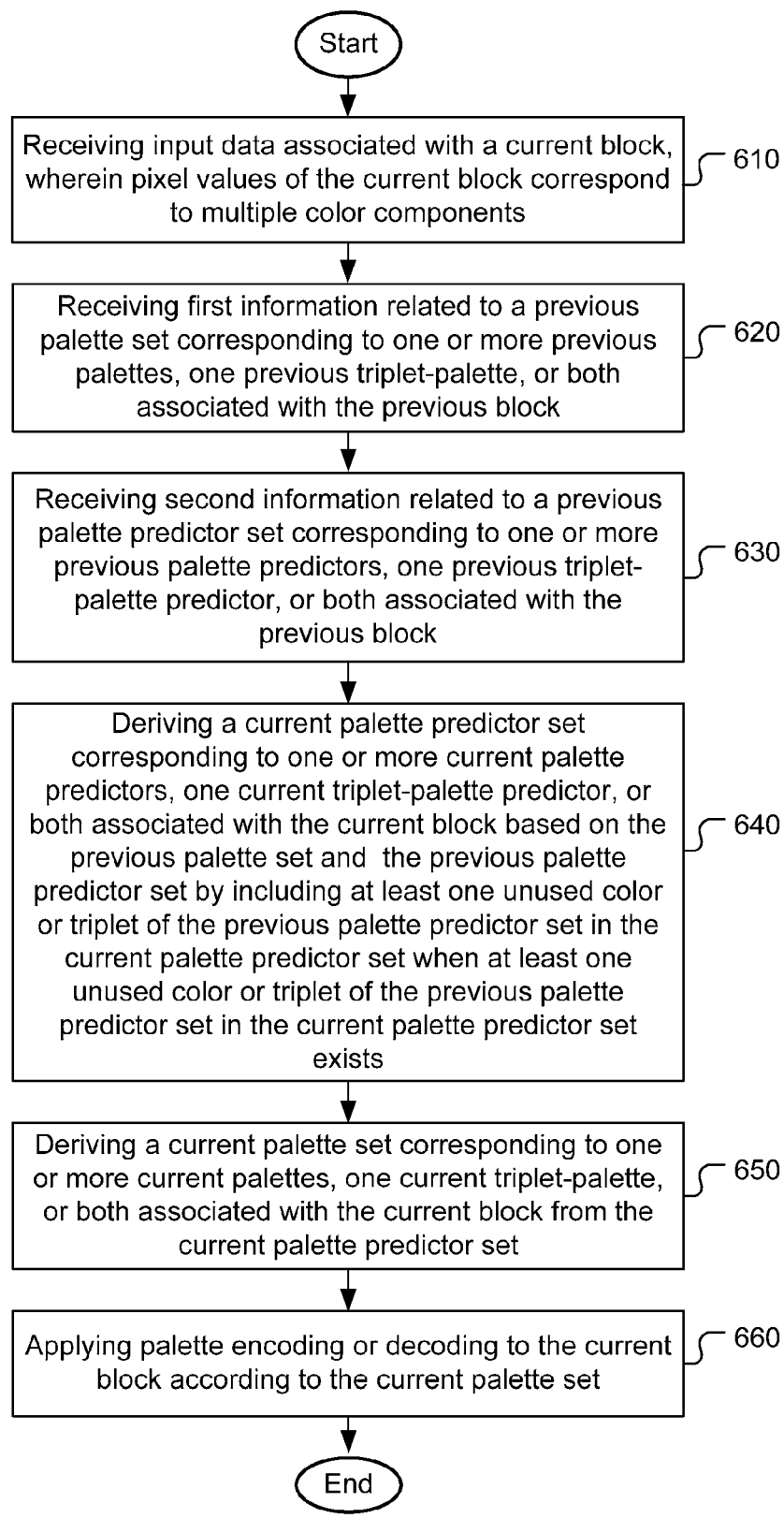
FIG. 6 illustrates an exemplary flowchart of a system for color index coding using a palette predicted from a palette predictor including one or more entries form a previous palette predictor according to an embodiment of the present invention.

FIG. 6 illustrates an exemplary flowchart of a system for color index coding using a palette predicted from a palette predictor including one or more entries form a previous palette predictor according to an embodiment of the present invention. The system receives input data associated with a current block as shown in step 610, where pixel values of the current block correspond to multiple color components. The input data corresponds to pixel data or color indices of the current block to be coded at an encoder side or corresponds to coded data or coded color indices of the current block to be decoded at the decoder side. The input data may be retrieved from memory (e.g., computer memory, buffer (RAM or DRAM) or other media) or from a processor. If a previous block is valid, first information related to a previous palette set corresponding to one or more previous palettes, one previous triplet-palette, or both associated with the previous block is received in step 620. Second information related to a previous palette predictor set corresponding to one or more previous palette predictors, one previous triplet-palette predictor, or both associated with the previous block is received in step 630. In one embodiment, there is at least one valid previous block associated with the current block as long as the current block is not at a first block in a slice, tile, largest coding unit row, or largest coding unit. A current palette predictor set corresponding to one or more current palette predictors, one current triplet-palette predictor, or both associated with the current block is derived based on the previous palette set and the previous palette predictor set by including at least one unused color or triplet of the previous palette predictor set in the current palette predictor set when at least one unused color or triplet of the previous palette predictor set in the current palette predictor set exists as shown in step 640. A current palette set corresponding to one or more current palettes, one current triplet-palette, or both associated with the current block is derived from the current palette predictor set as shown in step 650. Palette encoding or decoding is then applied to the current block according to the current palette set as shown in step 660.

The flowchart shown is intended to illustrate an example of color index coding using the palette predictor propagation across blocks according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding a block of video data using palette coding for a video coding system, the method comprising:
   receiving input data associated with a current block, wherein pixel values of the current block correspond to multiple color components;
   if a previous block is valid:
   receiving first information related to a previous palette set corresponding to one or more previous palettes, one previous triplet-palette, or both associated with the previous block;
   receiving second information related to a previous palette predictor set corresponding to one or more previous palette predictors, one previous triplet-palette predictor, or both associated with the previous block;

deriving a current palette predictor set corresponding to one or more current palette predictors, one current triplet-palette predictor, or both associated with the current block based on the previous palette set and the previous palette predictor set by including at least one unused color or at least one unused triplet of the previous palette predictor set in the current palette predictor set when said at least one unused color or said at least one unused triplet of the previous palette predictor set in the current palette predictor set exists;

deriving a current palette set corresponding to one or more current palettes, one current triplet-palette, or both associated with the current block from the current palette predictor set; and applying palette encoding or decoding to the current block according to the current palette set.

2. The method of claim 1, further comprising signaling one or more next updating signals for deriving a next palette predictor set based on the current palette set and the current palette predictor set.

3. The method of claim 1, wherein a number of said one or more previous palette predictors, said one previous triplet-palette predictor, or both in the previous palette set corresponds to M, and M sets of said one or more previous palette predictors, said one previous triplet-palette predictor, or both in the previous palette set are maintained at an encoder side or a decoder side, and M is an integer greater than zero.

4. The method of claim 1, wherein the previous block and the current block correspond to coding units or prediction units.

5. The method of claim 4, wherein said deriving the current palette predictor set depends on coding-unit size if the previous block and the current block correspond to the coding units, or said deriving the current palette predictor set depends on prediction-unit size if the previous block and the current block correspond to the prediction units.

6. The method of claim 1, wherein said deriving the current palette predictor set comprises updating the previous palette predictor set according to one or more updating signals.

7. The method of claim 6, wherein said one or more updating signals include a last palette-size or a new palette-size, wherein the current palette set is derived from the current palette predictor set by copying a number of beginning entries of the current palette predictor set, and the number corresponds to the last palette-size or the new palette-size.

8. The method of claim 6, wherein said one or more updating signals include new palette-size for each of said one or more current palettes, said one current triplet-palette, or both associated with the current block, a number of modification flags corresponding to new palette-size to identify whether a number of entries of each of said one or more current palettes, said one current triplet-palette, or both associated with the current block are updated, and a new value for each to-be-modified entry as indicated by a corresponding modification flag, and the new palette-size is an integer.

9. The method of claim 8, wherein at least one modification flag is context adaptive coded using context-adaptive binary arithmetic coding (CABAC).

10. The method of claim 8, wherein at least one modification flag is context adaptive coded using a bypass mode of context-adaptive binary arithmetic coding (CABAC).

11. The method of claim 6, wherein modification flags are used for beginning NP entries of each of said one or more current palettes, said one current triplet-palette, or both associated with the current block, and remaining entries are forced to be modified, where NP is a positive integer.

12. The method of claim 1, wherein if a palette size of said one or more previous palettes, said one previous triplet-palette, or both is smaller than a maximum palette size, then non-reused entries of said one or more previous palette predictors, said one previous triplet-palette predictor, or both are copied to current entries of said one or more current palette predictors, said one current triplet-palette predictor, or both after the current block is encoded or decoded by the palette coding.

13. The method of claim 1, wherein if a palette size of said one or more previous palettes, said one previous triplet-palette, or both is larger than a maximum palette predictor size, then one or more updating values associated with the previous palette predictor set are not used by the previous palette set, and wherein said one or more updating values are derived or transmitted.

14. The method of claim 1, wherein said deriving the current palette predictor set comprises checking and removing redundancy in the current palette predictor set.

15. The method of claim 14, wherein said checking and removing redundancy is performed before, during or after one or more new entries are placed into the current palette predictor set.

16. The method of claim 1, wherein if the current block is at a first block in a slice, tile, largest coding unit row, or largest coding unit, then the previous block is invalid and the current palette set is derived by an encoder without the previous palette set nor the previous palette predictor set.

17. The method of claim 16, wherein the encoder quantizes color values of the current block to color indexes for each color component and assigns two or more color indexes associated with one pixel of the current block to one triplet index.

18. The method of claim 17, wherein said two or more color indexes associated with said one pixel of the current block are mapped to said one triplet index according to the current palette set if said two or more color indexes associated with said one pixel of the current block are the same as color combination of said one triplet index, or if one part of said two or more color indexes associated with said one pixel of the current block is the same as a corresponding part of the color combination of said one triplet index and a remaining part of said two or more color indexes associated with said one pixel of the current block corresponds to one or more escape color indexes.

19. The method of claim 17, wherein the encoder determines a first histogram of the color values and selects a first set of representative colors as major colors for each color component; and the encoder determines a second histogram of triplet colors and selects a second set of representative color combinations as triplet colors.

20. An apparatus for coding a block of video data using palette coding for a video coding system, the apparatus comprising:

one or more electronic circuits configured to:
receive input data associated with a current block, wherein pixel values of the current block correspond to multiple color components;
receive first information related to a previous palette set corresponding to one or more previous palettes, one previous triplet-palette, or both associated with a previous block;

receive second information related to a previous palette predictor set corresponding to one or more previous palette predictors, one previous triplet-palette predictor, or both associated with the previous block;

derive a current palette predictor set corresponding to one or more current palette predictors, one current triplet-palette predictor, or both associated with the current block based on the previous palette set and the previous palette predictor set by including at least one unused color or triplet of the previous palette predictor set in the current palette predictor set when said at least one unused color or said at least one unused triplet of the previous palette predictor set in the current palette predictor set exists;

derive a current palette set corresponding to one or more current palettes, one current triplet-palette, or both associated with the current block from the current palette predictor set; and apply palette encoding or decoding to the current block according to the current palette set.

* * * * *